April 16, 1968    W. M. DAVIS    3,377,945
APPARATUS FOR DENSIFYING POWDERED SOLIDS
Filed Nov. 23, 1965    5 Sheets-Sheet 1

FIG. I

INVENTOR
WALTER M. DAVIS
BY
*Richard W. Sternberg*
ATTORNEY

INVENTOR
WALTER M. DAVIS
BY
*Richard W. Sternberg*
ATTORNEY

April 16, 1968     W. M. DAVIS     3,377,945
APPARATUS FOR DENSIFYING POWDERED SOLIDS
Filed Nov. 23, 1965     5 Sheets-Sheet 3

INVENTOR
WALTER M. DAVIS
BY
*Richard W. Sternberg*
ATTORNEY

INVENTOR
WALTER M. DAVIS

April 16, 1968  W. M. DAVIS  3,377,945

APPARATUS FOR DENSIFYING POWDERED SOLIDS

Filed Nov. 23, 1965  5 Sheets-Sheet

INVENTOR
WALTER M. DAVIS

BY
ATTORNEY

United States Patent Office 3,377,945
Patented Apr. 16, 1968

3,377,945
APPARATUS FOR DENSIFYING POWDERED SOLIDS
Walter M. Davis, St. Louis, Mo., assignor to Monsanto Company, St. Louis, Mo., a corporation of Delaware
Filed Nov. 23, 1965, Ser. No. 509,282
7 Claims. (Cl. 100—90)

ABSTRACT OF THE DISCLOSURE

The invention relates to an apparatus for materially increasing the density of finely divided or powdered silica aerogels and other similar aerogels which contain relatively large quantities of occluded or included air and/or other gases as a result of an antecedent pulverizing or grinding operation.

---

Silica aerogels, for example, those having extremely fine particles, often of microscopic size, are employed as flattening agents, pigments and the like in lacquer, paint, and other coating compositions. In order to reduce the aerogel particles to the proper size consistent with such uses, it is necessary to subject the silica aerogel to a comminuting, grinding, or pulverizing operation. However, when silica aerogel is pulverized or ground to the necessary degree of fineness, relatively large quantities of air and/or other gases become occluded or included therein and the resulting product has a very low density and is almost impossible to densify by vibrating means. In the past the prior art has found that it has been extremely difficult to densify or compress this material economically and efficiently. The prior art, as exemplified by U.S. Patent 2,633,074, generally teaches that it is desirable to compress the aforementioned materials without causing the individual particles to agglomerate. It was generally recognized, at that time, that agglomeration of the particles was considered to be undesirable since the material was thought to lose some of its hiding power and flattening efficiency. Furthermore, it was concluded that if, during densification, the particles are caused to agglomerate they can be redispersed, but usually only by a prolonged and uneconomical grinding operation.

In the manufacture of carbon black as, for example, lampblack, it is not generally necessary to pulverize or comminute the product since it is generally of the proper particle size as produced. However, relatively large quantities of air and/or other gases are generally occluded or included in the material as a result of the manufacturing operation. Such products and other powdered solids of substantially similar characteristics generally have a low density or low weight per unit volume, which in some instances may be as low as 1.0 lb. per cubic foot, the particular density in any case depending upon the manner in which the material has been manufactured, pulverized or ground and the nature of the material itself.

Consequently, it can be readily seen that the prior art has recognized the need for the densification of finely divided pulverant and/or powdered solid. However, the densified prior art materials still have certain inherent disadvantages associated therewith; specifically, and for example, it is to be noted that the densified material contains significant amounts of free-flowing, relatively small particles which cause a distinct dust problem. Furthermore, it will be noted that the handling problems are similar in that while the powdered material may be somewhat more densified, it is still in a flowable condition as heretofore mentioned and must be handled as such. Because of the continued low density of such materials even after treatment by means of the aforementioned prior art processes and/or apparatuses, it has now been found necessary to further compress or densify said materials to as high a degree as is possible and practical prior to packaging or shipping. Otherwise, the cost of packaging and shipping becomes a significant cost of the material under the present day transportation conditions. In accordance with the present invention, it has been found that the dry powdered materials may be compressed into a number of relatively large pieces, an aggregate, or a single block of material and shipped as such and subsequently disintegrated at the point of use into individual particles having substantially the same size as the original particles prior to densification and (the prior art not to the contrary withstanding) without losing any of its chemical and/or physical characteristics. The present invention then affords a somewhat simple, efficient and practical apparatus for producing such densified materials in a single unit form.

Accordingly, it is one object of the present invention to provide a simple and efficient apparatus for substantially increasing the density of substantially dry powdered solid materials which contain relatively large quantities of occluded or included air and/or other gases to form a large aggregate or consolidated product which is economical to ship and package, and which is easily disintegrated into its individual particles.

A still further object of the invention is to provide an apparatus for increasing the density of powdered silica aerogels and other powdered aerogels to provide a product having the characteristics described in the foregoing objects.

Other objects and advantages of the invention will appear or become apparent from the following description when taken in connection with the accompanying drawings and the appended claims.

Briefly, the present invention provides, in part, a pressure-operated, piston type cylinder compression apparatus with an accompanying compression chamber and an air exhaustion and retaining chamber hereinafter sometimes referred to as a shroud which comprises an extension of the compression chamber and embodies a container composed, in part, of flexible material. Generally the shroud is positioned immediately beneath the lowermost end of the aforementioned compression chamber; and the flexible container, inside the shroud, is preferably a cloth or paper bag into which the compressed material is extruded.

A variety of powdered and substantially dry solid materials can be densified according to the practice of the invention as described herein. The most important criteria for the materials to be processed are as follows: They should be free-flowing powders, preferably having an average particle size below 100 microns and a bulk density of less than 10 pounds per cubic foot. Thus, lampblack, which is prepared by the controlled oxidation or combustion of oil, can be densified immediately after it is collected by the method and apparatus herein described. Other substantially dry powdered solid materials such as dry and pulverized H-acid, DDT, and the like, which materials contain occluded or included air and/or other gases as a result of their method of preparation or as a result of a subsequent pulverizing, grinding, or comminuting operation, may also be successfully densified by the practice of the present invention. The present invention is particularly directed to the densification of pulverized or powdered, substantially dry finely divided siliceous materials such as silica gels, fume silica, silica aerogels, and commercial lampblacks which contain relatively large quantities of occluded or included air and/or other gases, and, for convenience, the invention will be described with reference to the densification of such material. However, it is to be noted that it is within the scope of the present invention to process other powdered solid materials, having the properties referred to above, in said apparatus.

Pulverized silica aerogels of the type hereinbefore described may be prepared in a variety of ways. In general, a silica aerogel having relatively coarse particles is prepared initially and is then pulverized or comminuted in a suitable apparatus such as a hammer mill, ball mill, air attrition mill or the like, until particles of the desired particle size are obtained. Such silica aerogel may be prepared, for example, by first reacting an aqueous alkaline silicate solution such as aqueous sodium silicate and an inorganic acid such as sulfuric acid to form a silica gel. This gel is first washed substantially free of inorganic salts or electrolytes and is then heated above the critical pressure of the liquid in the gel, which liquid may be water or some water-miscible organic liquid such as ethanol which has been employed to replace the water in the gel. The foregoing operation is carried out in a fixed volume system such as an autoclave and the heating is continued until substantially all of the liquid is converted to the vapor phase. The vaporized liquid is then slowly released from the fixed volume system at such a rate that the gel structure is not materially altered, that is, the gel occupies substantially the same volume as the gel originally placed in the system. The foregoing method is described in detail in the Kistler patents, U.S. Nos. 2,093,454; 2,188,007; and 2,249,767. The product so obtained is usually in lump form after removal from the autoclave and is then ground or pulverized to the requisite particle size as hereinbefore described.

A similar silica aerogel can be prepared by autoclaving a suitable acid-reacting silica organo-aquasol instead of a silica gel of the type described above. The procedure for autoclaving such an organo-aquasol is essentially the same as for the autoclaving of the silica gel. Such an acid-reacting silica organo-aquasol can be prepared by first reacting an alkaline silicate such as sodium silicate and an inorganic acid such as sulfuric acid and then adding thereto a water-miscible organic solvent such as ethanol or isopropanol in sufficient quantity to precipitate a substantial proportion of the electrolyte form during such reaction. The precipitated electrolyte is then removed as by filtration, centrifugation, or the like. Such an organo-aquasol and the method for preparing same is described in greater detail in the Marshall patent, U.S. No. 2,285,449.

The silica aerogels, prepared as described above, are usually obtained as a large mass and must be ground, prior to use, into a very fine powder having a majority of particles with a particle size less than 100 microns. In this state they are quite fluffy and contain relatively large quantities of occluded or included air. If they are compressed, they tend to return to their original volume when the pressure is released. Such powdered silica aerogels have a loose bulk density varying, in general, between about 1.0 lb. to about 6 lbs. per cubic foot and may be densified by the method and apparatus described herein to any practical density as, for example, a density of from about 8 to about 14 lbs. per cubic foot and remain in such state without returning to the loose bulk density upon standing. Fume silica generally is obtained directly by its manufacturing process in the form of a fluffy powder having many of the physical properties of aerogels, but sometimes may be comminuted further to produce smaller particles.

In the manufacture of lampblack by the controlled oxidation or combustion of oil, the product obtained generally has a density of from 4 to about 8 lbs. per cubic foot depending upon the method of preparation and the oil used. By the practice of this invention, the density of such product can be increased to about 10 to 30 lbs. per cubic foot and remain in such state without returning to the loose bulk density upon standing.

It is also possible by the practice of the present invention to continuously compact or densify powdered materials such as those described above and to obtain a product, which after disintegration to the somewhat original particle size, will perform both chemically and physically in substantially the same manner as the uncompacted material, notwithstanding the fact that the intermediate and novel treatment of the present invention has been carried out on said material.

*Apparatus description*

In the accompanying drawings, forming a part of this specification, and in which like numerals are employed to designate like parts throughout the same.

Referring more specifically to FIGURES 1 through 5 and as one preferred embodiment of the novel apparatus of the present invention, the densifying apparatus shown therein comprises, in part, a supporting frame 1 having a vertically extending, pressure-operated, e.g., hydraulic or pneumatic, cylinder 2 connected thereto by means of tension rods 3 and retaining plates 4 and 5.

The term "pressure-operated cylinder" as used herein refers to a commonly known and commercially available piece of equipment comprising a cylindrical casing in which is mounted a movable piston head attached to a ram or piston rod adapted to move along the longitudinal axis of the casing through one end of the casing, together with means to supply a fluid such as air or a hydraulic fluid under pressure to either face of the piston, as desired, to cause the piston and ram to move in the desired direction and with the requisite force. Since such equipment is well known to those skilled in the mechanical arts, a more detailed description thereof is not believed to be necessary.

Figure 1:
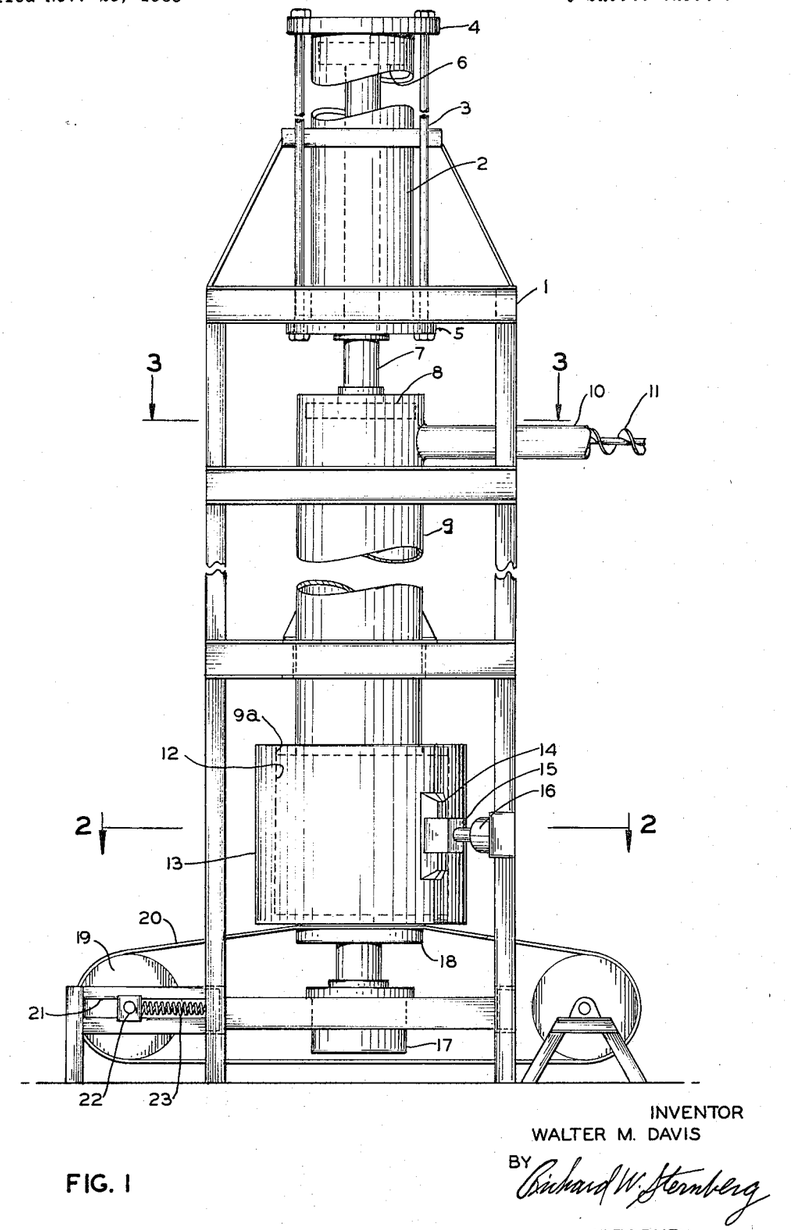
FIGURE 1 represents a side elevation, partly in section, showing one embodiment of a compression type densifying apparatus in accordance with the present invention, including a chamber in which finely divided solids are compressed, means for exhausting gases from such chamber, means for supplying a compressive force in such chamber, and means for discharging compressed solids from such chamber.

Positioned within cylinder 2 is a piston backstop 6 which is attached to ram 7, said backstop controlling the vertical movement of ram 7 which extends vertically downward through the bottom of cylinder 2 and is connected to piston head 8 which is adapted to move vertically upward or downward in an elongated vertically extending compression chamber 9. Positioned beneath the piston head 8 when it is in a fully retracted (upward) position is conduit 10 which opens into compression chamber 9 and which provides means for feeding dry powdered solid material into chamber 9. An example of such means is screw conveyor 11 which is positioned inside of conduit 10 and terminates short of chamber 9.

Figures 2, 4:
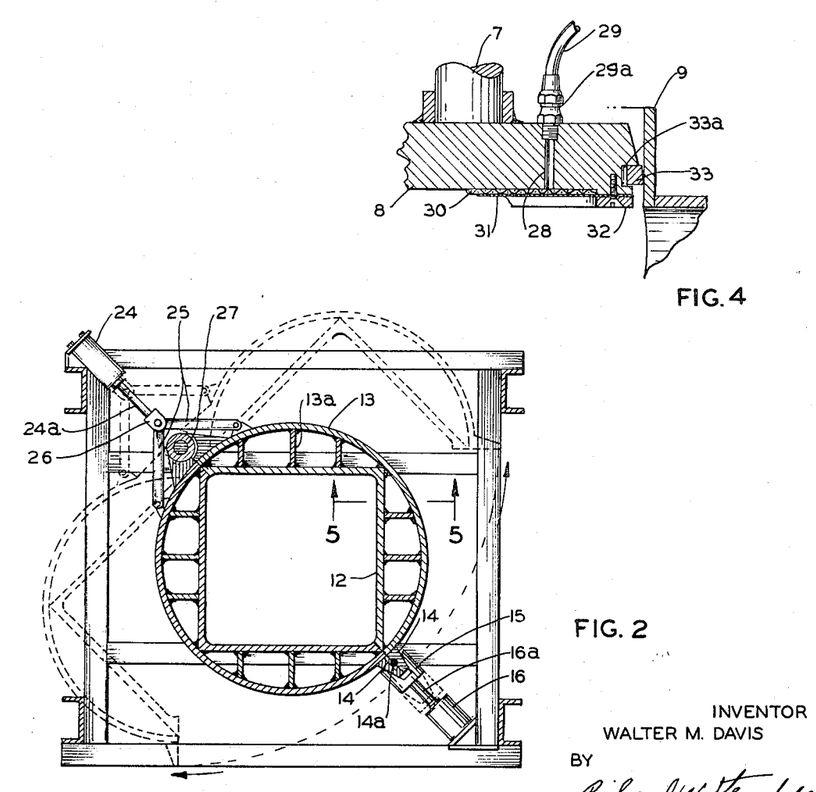
FIGURE 2 is an enlarged top view in cross-section taken along lines 2—2 of FIGURE 1.
FIGURE 4 is an enlarged vertical cross-sectional view taken along lines 4—4 of FIGURE 3.

As is shown particularly in FIGURES 1 and 2, there is positioned below the lowermost portion of compression chamber 9 an air exhaustion and retaining chamber 12, hereinafter referred to as shroud 12 for the sake of brevity. Shroud 12 in turn is mounted within a vertically extending, elongated reinforcing cylinder 13. As is shown in FIGURE 2, shroud 12 is connected to cylinder 13 by means of reinforcing ribs 13a. It is also within the scope of the present invention to provide a shroud having a wall sufficiently thick to prevent any rupture due to the internal pressure exerted thereon and thus eliminate the need for reinforcing cylinder 13 and ribs 13a. Reinforcing member or cylinder 13 (which is split as described in greater detail hereinafter) is provided with nipples 14 which are located on the exterior wall of reinforcing cylinder 13 and which extend at least a part of the vertical height thereof and preferably the full shroud height in order to provide better sealing means between the shroud members as hereinafter described. Positioned between nipples 14 is a seal 14a which provides an airtight connection between said nipples thus effecting an airtight shroud. The nipples 14 are held in adjacent positions and together, i.e. face to face relationship, by means of locking head 15 which is actuated or moved into contacting position with said nipples by the pressure-operated cylinder 16 which thrusts the ram 16a forward. While the present invention is generally directed towards the utilization of a pneumatic or gaseous pressure-operated cylinder, it is within the scope of the present invention that other means of power such as hydraulic (liquid) compression and electrically operated motors may be used to operate the piston cylinders mentioned herein. Also other means for closing and sealing shroud 12 may be used.

Positioned immediately beneath shroud 12 is a closure means 17 for the bottom portion of the shroud, preferably comprising a pressure-operated cylinder having a vertically movable and retractable piston head 18. Positioned also immediately beneath shroud 12 is a conveying means 19, preferably an endless conveyer having a belt 20, the upper portion of which is positioned between piston head 18 and the lower portion of shroud 12. This belt also functions as a seal and bottom closure for the shroud when the piston head is raised vertically to an extended position and tightly presses the belt against the bottom periphery of shroud 12. Endless conveyer 19 is also equipped with a guide 21, slide bearing 22, and spring 23 which all function together to effect the necessary tension on belt 20. Normally, when belt 20 functions as a seal and bottom closure for the shroud, it is in a stationary position, and is only free to move as a conveyor when piston head 18 is retracted downward. The actuating mechanism for starting the endless conveyer in operation when piston 18 is retracted downward and for stopping the endless conveyer when the piston is moved upward is not shown, but is of conventional construction and known to those skilled in the art.

Referring again specifically to FIGURE 2 which is an enlarged cross-sectional view taken along lines 2—2 of FIGURE 1, it will be noted that shroud 12 and its reinforcing cylinder 13 are made up of two half sections or members which, when joined together, form a rectangular parallelepiped and a right cylinder, respectively. It is also within the scope of the present invention to have various other forms or configurations for shroud 12 and cylinder 13 (e.g. based on the cross-sectional views, there may be mentioned triangular, polygonal, etc. cross section forms). Thus, the shroud and compression chamber 9 are not restricted to a rectangular cross section, although the cross-sectional configuration of each should be the same. Similarly, the cross-sectional configuration of reinforcing member 13 need not be circular. Shroud 12 and reinforcing cylinder 13 are connected to pressure-operated cylinder 24 through a series of scissor links 25 and clevis 26, which permit the individual half members to pivot on hinge 27 to an opened and closed position in an arc path as shown in the dotted outline.

Figure 3:
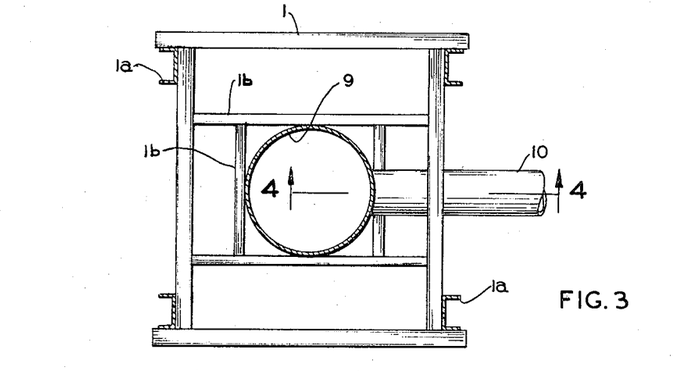
FIGURE 3 is a top view in cross-section taken along lines 3—3 of FIGURE 1.

Referring to FIGURE 3 which is an enlarged cross-sectional top view taken along lines 3—3 of FIGURE 1, compression chamber 9 is supported on support frame 1 by means of uprights 1a and crossbars 1b.

Referring to FIGURE 4 which is an enlarged cross-sectional view taken along lines 4—4 of FIGURE 3, there is shown piston head 8 provided with a vertically disposed cylindrical opening 28 to which is connected a flexible conduit 29 by means of fittings 29a. Flexible conduit 29 in turn is connected to a conventional vacuum and pressure system (not shown) which generally performs two functions. One function of the system is to exhaust gas from the interior of chamber 9 and shroud 12 during compression of the powdered solids. Another function of the system is to supply a blast of gas or air to the perforated lining and porous material (hereinafter referred to) to aid in the removal of any solids adhering to such porous material. Positioned immediately adjacent the face of piston (head) 8 is a supported perforated member such as screen 30 covered with a porous material 31 (e.g., a fabric or cloth) both of which are retained in position by means of retaining ring 32. The size of the openings in the perforated member, material of construction thereof, and type of porous material are not considered limitations herein; any porous material is satisfactory so long as the solid particles being compressed do not pass therethrough. As an example of the type of perforated member that can be used, there may be included steel screens such as a No. 325 mesh U.S. Standard steel screen. As an example of the type of porous material that may be used, there may be mentioned nylon, rayon, silk, etc.

Still referring to FIGURE 4, flexible sealing ring 33 positioned within annular groove 33a in the piston head provides an airtight connection between piston head 8 and compression chamber 9.

Figures 5, 6:
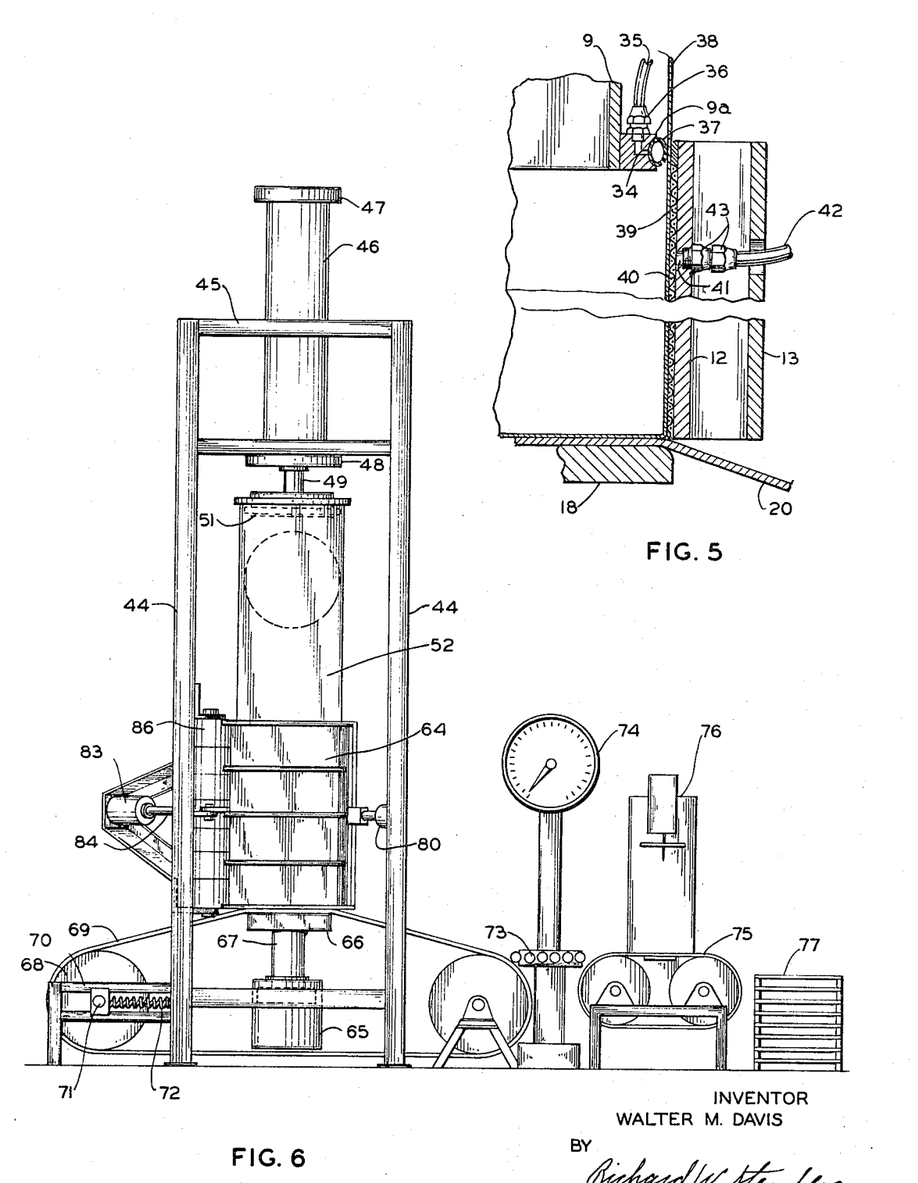
FIGURE 5 is an enlarged vertical cross-sectional view taken along lines 5—5 of FIGURE 2.
FIGURE 6 represents a front elevation showing another embodiment of a cylinder-piston type compressor apparatus constructed in accordance with the present invention.

FIGURE 5, as previously indicated, is an enlarged cross-sectional view of shroud 12 and reinforcing cylinder 13 taken along lines 5—5 of FIGURE 2. Located at the lowermost portion of compression chamber 9 is a rigid annular transition member or flange 9a which contains an L-shaped channel 34 extending from top to side and also contains means for providing an airtight connection between chamber 9 and shroud 12. Flexible conduit 35 is connected to the upper part of channel 34 by means of fittings 36. Expandable seal 37 is held in place by and extends around the periphery of flange 9a and communicates with the other terminal end of channel 34. The other end of flexible conduit 35 is connected to a vacuum and pressure system (not shown) which performs two functions. First, the system supplies a gaseous media such as air through channel 34 to seal 37 which is thus inflated or expanded by the air. Secondly, the systems exhaust any gaseous media from the interior area of said seal thereby causing the seal to deflate or contract. As is shown in FIGURE 5, seal 37 is also positioned immediately adjacent the uppermost portion of the interior wall of shroud 12, to press the wall of a porous container 38 (e.g. a paper bag) between it and shroud 12 so as to hold such container in an upright or vertical position after being positioned around flange 9a.

Positioned against the inner periphery of the shroud 12 and extending at least a part of the vertical height thereof, preferably the entire height thereof, is a perforated lining 39 (preferably a metal screen) which in turn is covered with a layer of porous material 40 (e.g. a fabric or cloth lining). The particular lining or porous material is unimportant, and the only requirement for the porous material is that it contain pores sufficiently small to retain any fine particles of material or solids, which are being compressed, within the compression chamber and said shroud. An example of a suitable screen is a steel No. 325 mesh U.S. Standard screen. An example of a suitable porous lining that can be used is close woven nylon fabric. Referring to FIGURE 5 and to shroud 12, it will be noted that the shroud has (in its vertical wall) an opening or conduit 41 to which is connected a flexible conduit 42 by means of fittings 43, conduit 42 being connected in turn to a conventional pressure and vacuum system (not shown) which performs two functions. First, the system supplies a gas to the area immediately adjacent the faces of screen 39 and lining 40 in order to remove any adhering solids after compaction. Secondly, the system exhausts any gaseous media from the interior area of said shroud in order to promote a more effective filling of shroud 12 and chamber 9, and to remove the occluded air during compaction.

Briefly, the operation of the aforedescribed embodiment of apparatus of FIGURES 1–5 comprises the steps of feeding substantially dry powdered solids into a confined space with the aid of a vacuum; and applying sufficient compressive force to said solids while in said confined space which is continuously under vacuum until the compressed solids will substantially retain the same volume after the compressive force is removed as that volume occupied under compression, such force being less than 200 pounds per square inch and preferably from about 100 to about 150 p.s.i.

A more detailed operation of such apparatus follows. In a single, pressure-operated, piston-cylinder system, such as described in FIGURES 1–5, and as shown in FIGURE 5, a porous, flexible container 38 such as a paper bag is inserted within the open halves of shroud 12 and is positioned around the outer periphery of flange 9a of the vertically extending elongated chamber 9. The container 38 is positioned in such a manner that at least a part of the upper portion of said bag, which is open at the top, extends beyond the topmost portion of said shroud 12 so that after the bag has been filled with the densified solid material from chamber 9, the uppermost portion of said bag can be used for forming a closure thereof by any conventional means such as sewing, gluing, etc. A gaseous media such as air is then introduced through conduit 34 into the expandable seal 37 which is thereby inflated to press against the interior wall of bag 38 thereby maintaining said bag in a fixed position while the shroud members are closed. It is preferred that the inner cross-sectional configuration and dimensions of the bag should be sufficiently similar to the outer cross-sectional configuration and size of flange 9a so that the bag fits rather snugly against flange 9a and deflated seal 37. When the bag is of such configuration and size then the expandable seal consequently holds the bag as previously mentioned in a fixed position without any additional support needed. However, where one desires to use larger bags, the sequence of the operation could be modified whereby the bottom closure plate, i.e. piston 18, for the shroud is raised after the bag has been inserted within the shroud halves to support said bag during the closure of said shroud halves. As a preferred embodiment, however, the operation will be described utilizing a bag configuration which will be supported by the aforementioned inflated expandable seal 37.

Air pressure is then supplied to cylinder 24 which causes the shroud halves or members to close by the forward movement of ram 24a and the scissor links 25. When the shroud is in a closed position, the nipples 14 are adjacent each other as described hereinbefore with particular reference to FIGURE 2. Air pressure is applied to cylinder 16 which causes the locking head 15 to advance toward shroud 12 and enclose nipples 14 thus forcing such nipples into a fixed or locked position. When the nipples are thus fixed in position, the joint or connection between the half sections of the shroud 12 is made airtight by seal 14a. Furthermore, when the half sections of the shroud are in a closed position, an airtight seal is formed between flange 9a and shroud 12 by the pressure of shroud 12 against the expandable seal 37. It is to be noted that the expandable seal generally has only 2 or 3 pounds of air pressure contained therein and consequently when the shroud members are closed, it is desirable to deflate the seal in order to prevent a rupture thereof due to the high pressure, i.e. greater than 100 p.s.i., experienced within the interior of shroud 12 during compaction.

After the shroud is closed, the piston head 18 is raised by supplying air pressure to cylinder 17 in a manner similar to that described with reference to cylinder 2. As the bottom closure of said shroud, i.e. piston head 18, is thus raised, a mechanism (not shown) cuts off the electricity to the endless conveyer motor belt (not shown). When the base plate or piston head 18 is fully extended upward to the base of shroud 12, endless conveyer belt 20 is pressed between the lower periphery of shroud 12 and the upper surface of the piston head 18 and thus provides an airtight seal between these two members and a bottom closure for shroud 12. With the piston head 18 in such a position and also forming a support surface for the aforementioned flexible container 38, air is exhausted, through means of conduits 41 and 42, from the interior area of shroud 12 whereby the flexible container 38 is maintained in a fully extended or open position therein (see FIGURES 4 and 5). Concurrently when the air is exhausted from the interior of said shroud, the screw conveyer 11 is placed into operation thereby feeding solid materials into chamber 9 and shroud 12, said screw conveyer being supplied with material from an automatic weighing system similar to member 62 shown in FIGURE 7. It is to be noted that after a predetermined quantity of powdered solids (which are to be subsequently densified) has been discharged from said weighing system, such system closes off the feed line to the screw conveyer in order to prevent outside air from entering into chamber 9 and shroud 12 or breaking the vacuum created in shroud 12 as previously described.

After the powdered material has been conveyed into the vertically extending elongated chamber 9 and shroud 12, the piston head 8 is forced downward to start compressing the solids. Air is also exhausted from chamber 9 by means of a vacuum system (not shown) through conduits 28 and 29 in piston head 8 as said piston is being lowered. However, it is also within the scope of the present invention to exhaust the air within chamber 9 through said conduits 28 and 29 in piston head 8 prior to the piston's being lowered and during the conveyance of said powdered solids into the chamber 9 in order to completely fill chamber 9. Piston head 8 is forced downward by means of ram 7 which in turn has been activated by supplying air pressure to the interior of the top portion of cylinder 2, that is, between retaining plate 4 and the uppermost surface of piston backstop 6.

Piston head 8 is caused to move downward, preferably at a uniform rate, until its front surface or face is flush with the bottom edge of chamber 9. This last operational step then causes the powdered materials to be compacted within shroud 12. During the compaction, air is continuously being exhausted (or a vacuum is maintained) from the inside of shroud 12 by means of conduits 41 and 42 and also from the inside of chamber 9 by means of conduits 28 and 29 in piston head 8. When piston head 8 is in its fully extended position, that is, with its front surface flush with the bottom edge of chamber 9, the air pressure being supplied to the top portion of cylinder 2 is discontinued and air pressure is supplied to the bottom portion of cylinder 2, specifically between retaining plate 5 and the lower surface of piston backstop 6 thus causing ram 7 to be forced upward and thereby retracting piston head 8 to its original position located above the plane in which conduit 10 is horizontally positioned.

The air located within the upper portion of cylinder 2 is exhausted by means not shown during the upward movement of piston backstop 6. Consequently with this retraction of piston head 8, air pressure is also supplied to cylinder 17 in a similar manner as that supplied to cylinder 2 and then piston head 18 is caused to move partially downward, e.g. about one or two inches, thus breaking the seal between belt 20 and the lower periphery of shroud 12. During the time piston 18 is partially retracted downward or shortly thereafter, air pressure is applied to cylinder 16 which causes the retraction of locking head 15 from nipples 14. Thereafter, air pressure is supplied to cylinder 24 which causes the half members of shroud 12 to be opened and consequently permits container 38 containing the compressed solid materials to be supported by belt 20 and piston 18 while it is being moved in a downward manner. (At this point seal 37 is fully deflated by means of a vacuum thereon in order that container 38 can freely drop onto piston 18.) It is to be noted that flexible container 38 thus rests on belt 20 and is then free to be conveyed horizontally away from the compression device after piston 18 is fully retracted. When the half members of shroud 12 are in a fully opened position, a blast of air is supplied through conduits 41 and 42 to the liner and screen positioned within the interior of said shroud in order to remove solids adhering to the surface of porous material 40. In a similar manner a blast of air is also supplied to the surface of piston head 8 in order to remove solids adhering to porous material 31.

As the piston 18 is moved downward to its lowermost position, a mechanism (not shown) is actuated which starts operation of the endless conveyer and belt 20. This belt conveys the bag 38 to a check weigh scale (similar to member 74 hereinafter described and as shown in FIGURE 6). After check weighing, the upper part of the bag is sealed by means of a sewing machine (similar to member 76 in FIGURE 6) or other commonly known means in the art such as gluing, stapling, etc. With the base plate 18 fully retracted downward and the half sections of shroud 12 in an open position, another flexible container or bag 38 may be inserted therein and positioned around the lowermost part of the elongated, vertically extending chamber 9 as described above. The operation or process may then be repeated and another bag filled with densified material as heretofore set forth.

With reference to the single stage compression device above described, it will be noted that said apparatus, as a preferred embodiment, generally is positioned in a vertically extending manner. As an example of the operation of such a device, the volume of solid materials supplied to chamber 9 and shroud 12 prior to compression is usually about 4 times that of the volume of the compressed solid material as finally obtained in shroud 12. Where it is desired to compress larger volumes of powered solids and without increasing the cross-sectional area of the compression chamber and shroud, it has been found that chamber 9 must be extended vertically or increased in height to such an extent that from a practical consideration the overall height of the device may be excessive for most buildings in which it may be housed. Consequently and as another preferred embodiment of the present invention, there is illustrated in FIGURES 6 through 11 a two-stage or step compressing or densifying apparatus wherein the first compressing stage is positioned horizontally and is connected to the second compression stage which is positioned vertically. With the utilization of this type of apparatus, the overall height of the device is not greater than for a single stage compression device such as shown in FIGURES 1–5, and yet a greater volume of the powdered solid material can be compressed. While the following description will be directed to a two-stage compressing or densifying apparatus, it is also within the scope of the present invention to provide a multi-step compressing or densifying apparatus comprising a series of compression chambers and associated piston, pressure-operated cylinders, all of which are arranged in a variety of positions but which perform the same function as described herein.

Figures 7, 11:
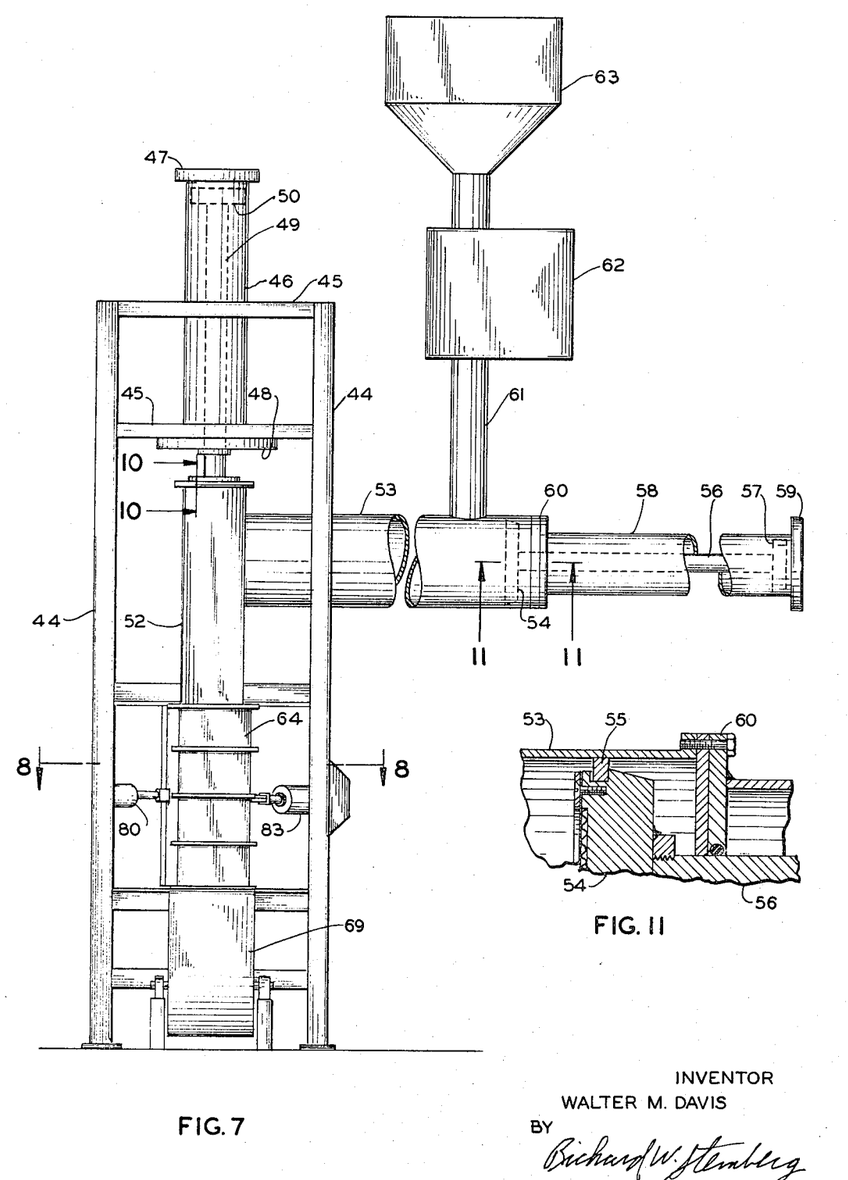
FIGURE 7 is a side elevation thereof.
FIGURE 11 is an enlarged cross-sectional view in detail of the horizontal cylinder's piston taken along lines 11—11 of FIGURE 7.

Referring more specifically to FIGURES 6 and 7, support frame 44, having crossbars 45, supports a vertically extending, pressure-operated cylinder 46 which is similar in construction to cylinder 2 set forth in FIGURE 1. Cylinder 46 is fixably attached to the support frame 44 and crossbars 45 by means of retaining plates 47 and 48 which are held together by tension rods (not shown) which are similar to those shown in FIGURE 1. Positioned within cylinder 46 is a piston backstop 50 which is attached to ram 49 and limits the upward movement thereof. Ram 49 extends vertically downward through the bottom of cylinder 46 and is connected to piston head 51 which is adapted to move vertically upward or downward in an elongated, vertically extending compression chamber 52. Opening into chamber 52, near the upper portion thereof, and positioned substantially perpendicular thereto is an elongated, horizontally extending compression chamber 53 which is shown in more detail in FIGURE 7. Chamber 53 contains piston 54, which is provided with an annular seal 55, and this piston is positioned near the outermost end of the chamber when in a fully retracted position. Piston head 54 is similar in construction to piston head 51, and is provided with a perforated member, a porous material to permit the passage of gases, but not solids, and a means for supplying gases or exhausting gases from chamber 53. Located outward from and adjacent to chamber 53 and along substantially the same longitudinal axis is pressure-operated cylinder 58. Positioned within cylinder 58 is a piston backstop 57 which is attached to ram 56 which extends horizontally through the wall of cylinder 58 and is connected to piston head 54 which is adapted to move horizontally back and forth in chamber 53.

Cylinder 58 is supported by means of retaining plates 59 and 60, said retaining plates 59 and 60 being held together by means of tension rods which are not shown in FIGURE 7 but are similar to the tension rods 3 as shown in FIGURE 1. Located near retaining plate 60 and opening into the top portion of chamber 53 is conduit 61 which is used to feed the solid materials into chamber 53. This conduit extends vertically and is connected at its upper end to a weighing system 62 and hopper 63 which is provided for storage of the powdered solids to be compressed. Any conventional means can be utilized to supply the powdered solids to hopper 63. The material in hopper 63 is conveyed to weighing system 62 by means of gravitational flow. Weighing system 62 may be any of the commercially available weighing systems, but is preferably an automatic system which weighs out a predetermined amount of material and discharges said material on a periodic basis. The material being discharged from weighing system 62 then falls by gravity through conduit 61 into compression chamber 53. More specific details of the operation of this system are set forth hereinafter. It might be noted that the weighing system and hopper are not essential features of the apparatus of this invention. In fact any means for supplying predetermined quantities of powdered solids to chamber 53 may be used.

Positioned immediately beneath compression chamber 52 is an air exhaustion and retaining chamber 64, hereinafter referred to as shroud 64 for the sake of brevity, and which will be discussed in more detail hereinafter. Positioned immediately beneath shroud 64 is a pressure-operated cylinder generally indicated as 65 and which includes a vertically movable piston head 66 which can be raised or lowered by means of ram 67. Located also immediately beneath shroud 64 is an endless belt conveyor generally designated 68, provided with an endless belt 69. The upper portion of this belt is above piston head 66 and functions as a seal when said piston head 66 is vertically raised to an extended position so as to press the belt against the lower periphery of shroud 64. Endless conveyor 68 is also equipped with a guide 70, slide bearing 71, and spring 72, which all function together to effect the necessary tension on belt 69.

As is shown in FIGURE 6, there is located immediately adjacent to one end of conveyor 68, rollers 73 which function to transfer containers of compressed solids conveyed on belt 69 (as will be explained in greater detail hereinafter) to be weighed on weighing scale 74. Located immediately adjacent to and on the other side of scale 74, i.e. opposite the side where conveyor 68 is positioned, is an endless conveyor 75 which subsequently conveys the container of compressed solids to and from sewing machine 76. This machine operates to sew or close the upper part of the open container. Pallets 77 are positioned adjacent sewing machine 76 for ready storage of the containers. The features described in this paragraph are not essential features of the apparatus of this invention, but, together with the other parts described, comprise a preferred embodiment of the apparatus of the invention.

Figure 8:
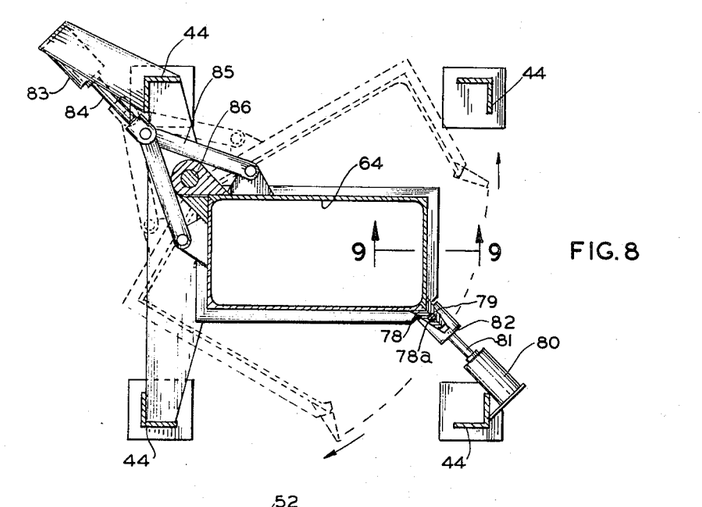
FIGURE 8 is an enlarged vertical cross-sectional view taken along lines 8—8 of FIGURE 7.

FIGURE 8 is a cross-sectional view along lines 8—8 of FIGURE 7. While shroud 64, as shown, has a rectangular cross-sectional configuration with horizontally disposed strengthening bands 87 surrounding the outer perimeter (as shown in more detail in FIGURE 9), it is also within the scope of the present invention to employ a shroud having other cross-sectional forms or configurations (e.g., triangular, circular, polygonal, etc.). Furthermore, shroud 64 (like shroud 12) can be so constructed that its walls are sufficiently thick to prevent any rupture due to the internal pressure exerted thereon and thus eliminate the need for the aforementioned strengthening bands 87.

As shown in FIGURE 8, shroud 64 is composed of two half sections or members each of which is free to pivot on hinge 86 and contains nipples 78, both nipples being positioned immediately adjacent to each other when the two half sections are in a closed position to form the aforementioned rectangular cross-sectional configuration. Positioned within cavity 78a of nipples 78 is a flexible seal 79 which provides an airtight closure when such half sections are in a closed and locked position, as shown. Shroud 64 is maintained in a closed position by means of a mechanism which comprises the locking, pressure-operated cylinder 80 which extends ram 81 provided with locking head 82 to surround the nipples 78. When locking head 82 is in a retracted position, pressure-operated cylinder 83 then can be used to open the shroud by retracting ram 84 which has attached thereto scissor links 85 and clevis which in turn are connected to the half members. Diagonally opposite nipples 78, positioned on the shroud, is a hinge 86 (referred to above) one member of which is attached to one half section, the other member being attached to the other half-section. This hinge supports the half sections of the shroud and provides means for the pivotal movement on an arc path, as shown by the dotted outline of the two half members of shroud 64.

Figure 9:
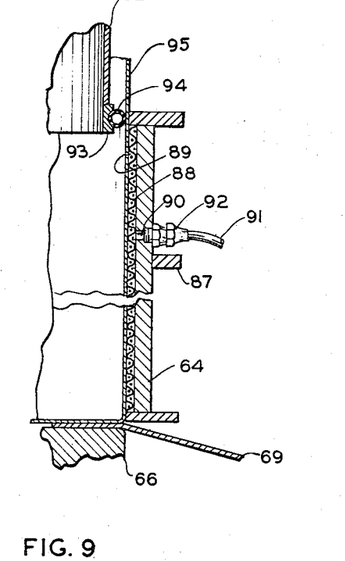
FIGURE 9 is an enlarged cross-sectional view taken along lines 9—9 of FIGURE 8.

FIGURE 9 is an enlarged cross-sectional view of shroud 64 taken along lines 9—9 of FIGURE 8. It will be noted that the details set forth in FIGURE 9 of the construction of the shroud, which is positioned beneath the lowermost portion of compression chamber 52, are similar to the details of construction of similar elements set forth in FIGURE 5.

As previously pointed out, horizontal strengthening bands 87 surround the exterior portion of shroud 64 and function in a similar manner as cylinder 13 which reinforces shroud 12 as shown in FIGURES 1 and 2. As previously mentioned, bands 87 and cylinder 13 (and ribs 13a) can be eliminated, e.g. by increasing the shroud wall thickness.

Positioned against the inner periphery of shroud 64 and extending at least a part of the vertical height, preferably the entire height, thereof, is a perforated lining 88 (preferably a metal screen) which in turn is covered with a layer of porous material (e.g. a fabric or cloth lining) 89. The particular lining or porous material is unimportant and the only requirement for the porous material is that it contain pores sufficiently small to retain any fine particles of material or solids, which are being compressed, within the compression chamber and the shroud. An example of a suitable porous material that can be used is a close woven nylon fabric.

Referring to shroud 64 as shown in FIGURE 9, the shroud has (in its vertical wall) an opening or conduit 90 to which is connected a flexible conduit 91 by means of fittings 92, conduit 91 being connected in turn to a conventional pressure and vacuum system (not shown). This system functions in a similar manner as the pressure and vacuum system described with reference to shroud 12—FIGURE 5—and the description thereof will not be repeated for the sake of brevity.

Located at the lowermost portion of compression chamber 52 is a rigid annular transition member or flange 93 which also contains means for providing an airtight connection between chamber 52 and shroud 64. This means comprises an expandable seal 94 which also retains a porous flexible container such as a paper bag 95 in position. This seal 94 and means to inflate and deflate it (not shown in FIGURE 9) are of similar construction to seal 37 and its accompanying elements 34, 35, and 36 previously described in regard to FIGURE 5.

Figure 10:
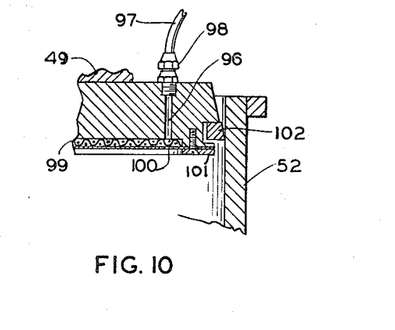
FIGURE 10 is an enlarged cross-sectional view in detail of the vertical cylinder's piston taken along lines 10—10 of FIGURE 7.

FIGURE 10 represents an enlarged cross-sectional view taken along lines 10—10 of FIGURE 7 and is similar in construction to the elements shown in FIGURE 4. Specifically, it will be noted in FIGURE 10 that piston 51 is provided with a vertically disposed channel or opening 96 to which is connected a flexible conduct 97 by means of fittings 98. This flexible conduit is in turn connected to a conventional vacuum and pressure system (not shown) which functions in a similar manner as the pressure and vacuum system hereinbefore described with reference to FIGURE 4. Positioned immediately adjacent the face of piston (head) 51 is a supported perforated member such as screen 99 covered with a porous material 100 such as a nylon fabric lining. Both screen 99 and lining 100 are retained in position and detachably fixed to piston 51 by means of retaining ring 101. Located within an annular groove (similar to groove 33a in FIGURE 4) in piston head 51 is a sealing ring 102 which provides an airtight connection between compression chamber 52 and piston head 51.

FIGURE 11 illustrates an enlarged cross-sectional view taken along lines 11—11 of FIGURE 7. The details of construction of piston head 54 is similar to that of piston 8 as shown in FIGURE 4 or piston 51 as shown in FIGURE 10.

In regard to the above-described embodiment of the apparatus of the present invention (depicted in FIGURES 6 through 11 relating to the dual chamber compression apparatus comprising dual pressure-operated compression cylinders), the operation of this system is somewhat similar to the operation of the single cylinder compression system previously described (in regard to FIGURES 1–5). For the sake of brevity the operation of the entire apparatus will not be repeated, but only the essential operations will be described. Thus a porous walled bag 95 is first positioned inside the half sections of shroud 64 and adjacent the lower portion of the vertically extending chamber 52. The bag 95 (or flexible container hereinbefore described) is secured in position below chamber 52 by expandable seal 94 (see FIGURE 9) which has been inflated with a gaseous media such as air. The shroud 64 is then closed by applying air to cylinder 83 which thrusts ram 84 forward and causes scissor links 85 to swing the open half members of the shroud into a closed position thereby forming a rectangular cross-sectional form. Thereafter locking cylinder 80 is actuated by air pressure and consequently locking head 82 is wedged against nipples 78 by means of moving ram 81. Air pressure is then applied to piston cylinder 65 which results in the raising of piston head 66 upwardly. As the base plate or piston head 66 is thus raised, it actuates a mechanism (not shown) which in turn cuts off the electricity to the endless conveyor belt motor (not shown). As previously described, the endless conveyer belt forms a seal around the peripheral area connection between the bottom of the shroud and piston head 66 when such piston head is in its upwardly extended position. Air is then exhausted from the interior area of the shroud through members 90 and 91 and the powdered material to be densified is then metered out from the weighing system 62 and falls by gravity through conduit 61 into compression chamber 53. Then piston 54, positioned within the horizontally extending chamber 53, is used to partially compress the material therein by moving same from the right-hand portion of chamber 53 to the left-hand portion whereby the solids are conveyed into the elongated vertically extending chamber 52. During the lateral movement of piston 54, the aforementioned vacuum system connected thereto exhausts gas from chamber 53 in order to remove air (or occluded air) therefrom. When the piston head 54 is in the fully extended position, it acts as part of the wall of the vertically extending chamber 52. It will be noted that gas is also exhausted from chamber 52 by means of the vacuum system previously described relative to piston 51 when such piston is moved downwardly. Consequently, it can readily be seen that air is exhausted from the overall closed system during compaction by three means, i.e. the two piston head faces and through the shroud vacuum system. When the horizontally movable piston 54 is in a fully extended position (that is, adjacent to chamber 52) and closing the opening between chambers 52 and 53, the downwardly movable piston 51 is forced downward by actuating pressure-operated cylinder 46. This results in the second stage compression of the solid powdered material in chamber 52 and shroud 64 and piston head 51 is forced downward until the solid material is completely densified and contained within the aforementioned flexible container 95 and shroud 64. Stated differently, this piston head 51 is then forced downward by means of ram 49, preferably at a steady rate, until its front surface or face is flush with the bottom edge of chamber 52. With piston 51 in this fully extended position, the air pressure to cylinders 46 and 65 is reversed (as previously described with reference to cylinders 2 and 17) to cause retraction of piston heads 51 and 66; i.e. piston head 51 is raised and the piston head 66 is lowered. After piston head 51 is in a completely retracted position, then piston head 55 is then retracted by means of reversing the air pressure to cylinder 58. The bag containing the compressed solids is then removed from the shroud, sewed closed and stored in a similar manner as set forth regarding the description of the single piston type cylinder previously described. Both piston faces and the screen positioned within the shroud are subjected to a blast of air in order to remove any adhering solids and the overall operation is then repeated to fill another bag.

While the two preferred embodiments heretofore described are generally directed to a densifying device positioned in a vertical manner (particularly with reference to the single cylinder compression device which was the first preferred embodiment described herein), it is within the scope of the present invention that said devices can be aligned entirely in a horizontal position and operated in such a manner. Any minor modifications relating to the physical disposition of said densifying device would be well within the scope of the present invention, e.g. rearrangement of the endless conveyer which transfers the compressed solids to the weighing scale. Furthermore and as previously mentioned, it is also within the scope of the present invention to have a multi-stage compression apparatus comprising a series or multiple of interconnected compression chambers and associated piston-pressure operated cylinders. The position of said chambers, i.e. vertically or horizontally extending, is not a limitation and said chambers can be arranged in any manner so long as they function in the same way as previously described with reference to the operation of the single and double chambers.

As pointed out heretofore, the novel apparatus of the present invention is generally directed to a device for densifying powdered solids and is more particularly directed to the densification of powdered solids such as, for example, silica aerogels, fume silicas, etc. However, it is to be noted that it is within the scope of the present invention to process other types of powdered solids in said apparatus, such as lampblack, calcium carbonate, soda ash, etc.

It will be understood, of course, that modifications can be made in the two aforementioned preferred embodiments of the present invention heretofore described and illustrated herein without departing from the scope of the invention as defined by the appended claims.

What is claimed is:

1. A compressing device for densifying substantially dry powdered solids comprising: (a) a first means for applying compressive pressure on said solids; (b) a second means positioned immediately adjacent said first means for receiving and retaining said solids during part of the time such solids are subjected to compression by said first means; (c) a third means disposed immediately adjacent said second means for confining the solids in a fixed volume space during final compression thereof and including (1) a supported perforated member disposed to confine said solids against lateral displacement, (2) a porous lining disposed to cover the inner periphery of the perforated member, said lining being sufficiently porous to permit the passage therethrough of gases but to exclude the passage of said solids, (3) means to move said third means, including said perforated member and said porous lining, out of contact with the relatively fixed powdered solids after compression thereof, and (4) means to exhaust gas from said solids through said perforated member and porous lining during compression of said solids and (d) a fourth means to remove compressed solids from said device.

2. The device as in claim 1 wherein the first means is a vertically extending, pressure-operated cylinder provided with a retractable piston whereby said piston also functions as a top closure for said third means when in a fully extended, lowered, position; the second means is an elongated, vertically extending, compression chamber positioned immediately beneath said first means and in which the aforementioned piston head moves in an upward and downward movement within said compression chamber; the third means is a shroud comprising a vertically extending hollow container having a mesh screen and a fabric lining, heretofore defined respectively as items (1) and (2), disposed against the inner periphery of said shroud and extending at least a part of the vertical height thereof, the uppermost portion of said shroud being adjacent the lowermost portion of said second means; and the fourth means is a conveyer belt which provides a seal for the bottom portion of said shroud and also conveys the solids from said device after said solids have been compressed.

3. The device as in claim 1 wherein the first means comprises (a) a vertically extending, pressure-operated cylinder having a retractable piston, and (b) a horizontally extending, pressure-operated cylinder having a retractable piston; the second means comprises (1) a vertically extending, elongated, compression chamber positioned immediately beneath the vertically extending pressure-operated cylinder whereby the piston from said cylinder is adapted to move in an upward and downward manner in said vertically extending chamber and also functions as a top closure for said third means when in a fully extended, lowered position, and (2) a horizontally extending, elongated, compression chamber positioned perpendicular to said vertical chamber and opening into said vertical chamber whereby the piston of said horizontal cylinder moves in a backward and forward manner in said horizontally extending chamber and functions as part of the wall of said vertically extending chamber when in a fully extended, forward position; the third means is a shroud comprising a vertically extending hollow container having a mesh screen and a fabric lining, heretofore defined as items (1) and (2), respectively, disposed against the inner periphery of said shroud and extending at least a part of the vertical height thereof, the uppermost portion of said shroud being adjacent the lowermost portion of said second means; and the fourth means is a conveyer belt which provides a seal for the bottom portion of said shroud and also conveys the solids from said device after said solids have been compressed.

4. The device as set forth in claim 2 wherein said shroud comprises two half sections connected together by means of a hinge at one joint and a pair of adjacent nipples, each of which is fastened to a half member, located at the opposite joint from said hinge and held together by a locking head which partially encloses said nipples, said locking head being removably detached from said nipples by means of a first pressure-operated, piston-ram type cylinder and said half members being adapted to pivot on said hinge in an arc path by means of a second pressure-operated, piston-ram type cylinder and intermediate linkage connecting said half members and the ram of said second pressure-operated cylinder.

5. The device as set forth in claim 3 wherein said shroud comprises two half sections connected together by means of a hinge at one joint and a pair of adjacent nipples, each of which is fastened to a half member, located at the opposite joint from said hinge, and held together by a locking head which partially encloses said nipples, said locking head being removably detached from said nipples by means of a first pressure-operated, piston-ram type cylinder and said half members being adapted to pivot on said hinge in an arc path by means of a second pressure-operated, piston-ram type cylinder and intermediate linkage connecting said half members and the ram of said second pressure-operated cylinder.

6. The device as set forth in claim 4 wherein the piston face of the vertically extending, pressure-operated cylinder is provided with a supported mesh screen covered with a cloth lining and the further combination therewith of means adapted to supply a gaseous media to and exhaust a gaseous media from the area in front of said piston face.

7. The device as set forth in claim 5 wherein the piston face of the vertically extending, pressure-operated cylinder is provided with a mesh screen covered with a cloth lining, and the further combination therewith of means adapted to supply a gaseous media to and exhaust a gaseous media from the area in front of said piston face.

References Cited
UNITED STATES PATENTS

| | | | |
|---|---|---|---|
| 315,529 | 4/1885 | McGowan | 100—255 |
| 772,472 | 10/1904 | Neill | 100—122 |
| 2,244,078 | 6/1941 | Perlberg | 100—232 |
| 2,343,871 | 3/1944 | Livoti | 100—127 |
| 2,488,395 | 11/1949 | Goldberg | 100—90 |
| 2,607,435 | 8/1952 | Dohse | 100—90 |
| 2,633,074 | 3/1953 | Davis | 100—90 |
| 2,780,247 | 2/1957 | Claassen | 141—7 |
| 2,959,900 | 11/1960 | Nollett | 53—24 |
| 2,984,172 | 5/1961 | Roberts et al. | 100—90 |
| 3,053,022 | 9/1962 | Vogt | 53—24 |

LOUIS O. MAASSEL, *Primary Examiner.*

WALTER A. SCHEEL, *Examiner.*